United States Patent [19]

Rasmussen

[11] 3,925,371

[45] Dec. 9, 1975

[54] BENZOTHIAZINE-1,1-DIOXIDES

[75] Inventor: Chris Royce Rasmussen, Ambler, Pa.

[73] Assignee: McNeil Laboratories, Incorporated, Ft. Washington, Pa.

[22] Filed: Sept. 23, 1974

[21] Appl. No.: 508,116

[52] U.S. Cl. .......................... 260/243 R; 424/246
[51] Int. Cl.[2] ...................................... C07D 279/02
[58] Field of Search ............................. 260/243 R

[56] References Cited
UNITED STATES PATENTS 3,646,020  2/1972  Zinnes et al. ..................... 260/243

3,853,862  12/1974  Lombardino ..................... 260/243

*Primary Examiner*—John M. Ford

[57] ABSTRACT

Novel carbonate esters of 3-heteroarylcarbamyl-4-hydroxy-2H-1,2-benzothiazine 1,1-dioxides are disclosed. The esters have therapeutic properties in anti-inflammatory, anti-thrombotic and analgesic applications.

2 Claims, No Drawings

BENZOTHIAZINE-1,1-DIOXIDES

DESCRIPTION OF THE INVENTION

This invention relates to novel carbonate esters of 3-heteroarylcarbamyl-4-hydroxy-2H-1,2-benzothiazine 1,1-dioxides, and more particularly to the esters represented by the formula

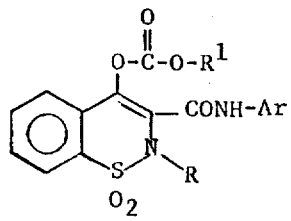

(I)

In this and succeeding formulas, R is lower alkyl, $R^1$ is lower alkyl, aryl or aralkyl, and Ar is heteroaryl.

In the foregoing definitions of R and $R^1$, the expression "lower alkyl" refers to a straight or branched hydrocarbon chain having from 1 to about 6 carbon atoms, such as for example, methyl, ethyl, propyl, isopropyl, sec.-butyl, pentyl, isoamyl, n-hexyl, isobutyl, 2-hexyl, etc. The preferred "aryl" radical is phenyl and the preferred "aralkyl" radical is benzyl. The expression "heteroaryl" refers to 2-thiazolyl, 3-isoxazolyl and mono- and dimethyl substituted 2-thiazolyl and 3-isoxazolyl, such as 4-methyl-thiazol-2-yl, 5-methyl-isoxazol-3-yl, 4,5-dimethylthiazol-2-yl, and 4,5-dimethylisoxazol-3-yl.

The preferred compounds are those in which R is methyl, and $R^1$ is methyl, ethyl, phenyl or benzyl.

The novel compounds of Formula I are generally crystalline solids soluble in organic solvents such as dimethyl formamide, dimethyl sulfoxide, ethers such as dioxane, dimethyl ether of diethylene glycol, tetrahydrofuran and the like, ketones such as acetone, 2-butanone, etc., and halohydrocarbons such as 1,2-dichloroethane, chloroform, etc. Generally, they are of low solubility in such solvents as petroleum hydrocarbons and water.

The novel carbonate esters of Formula I have numerous utilities. For example, they are useful as anti-inflammatory agents for alleviating the painful symptoms of arthritis and other inflammatory disorders. The compounds also are useful an antithrombotic agents adapted to be employed for the treatment of cardiovascular diseases. In addition, the compounds are useful as analgesic agents.

The novel carbonate esters of the present invention may be prepared by reacting a benzothiazine dioxide compound represented by the formula:

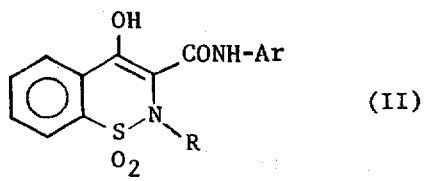

(II)

with a chloroformic ester represented by the formula

(III)

in the presence of a base. (It is to be understood that the reactant benzothiazine dioxides represented in Formula II in the enolic form, in the case of certain compounds may partially exist in the tautomeric keto form. It is also to be understood that although the reactions are described in terms of a chloroformic ester, other haloformic esters may be substituted, if desired.) The preparation of the carbonate esters is preferably carried out in a solvent medium, either aqueous or organic, and the temperature range of from about 0° to about 50°C as hereinafter more fully described. The exact amounts of the reactants are not critical but for good yields, especially under aqueous conditions, it is desirable to use molar excessess of the chloroformic ester and the base.

In one method for carrying out the reaction, the starting material of Formula II is dissolved in an aqueous alkaline solution and the chloroformic ester is added thereto portionwise and with stirring while the pH is maintained in the range of from about 8 to about 12. The aqueous alkaline solution is preferably of aqueous alkali hydroxide such as sodium hydroxide, potassium hydroxide and the like, or aqueous alkali carbonate such as sodium carbonate, potassium carbonate and the like. The reaction is exothermic and it is desirable to add the chloroformic ester in a portionwise manner. The reaction may be further moderated by using a large volume of solvent and/or cooling. When the reaction is carried out in an aqueous solvent, some of the chloroformic esters tend to undergo hydrolysis; thus, it is desirable to use excess chloroformic ester. From two to ten-fold molar excess may be employed. Since the hydrolysis of the ester removes the base necessary for the primary reaction to proceed, excess base is preferably employed also. Such amounts of base are added to maintain the pH in the range of from about 8 to 12. As a result of these operations, a reaction takes place with the formation of the desired carbonate ester product which generally precipitates as a solid in the reaction mixture and an inorganic salt by-product. The product may be recovered by filtration and purified by conventional procedures such as washing, recrystallization, etc.

An alternative method for carrying out the reaction is particularly useful when the starting material of Formula II is of low solubility in the aqueous alkaline media. In this method, the compound of Formula II is dissolved in an organic solvent and a base added thereto as a first step whereupon there is formed a conjugate base of the starting material. Thereafter, the chloroformic ester is added portionwise with stirring to obtain the desired carbonate ester product and chloride salt by-product. Suitable solvents for carrying out the reaction include hexamethylphosphoric acid triamide, N,N-dimethylformamide, dimethyl sulfoxide, and the like; ethers such as tetrahydrofuran, dioxane, 1,2-dimethoxyethane, dimethyl ether of diethylene glycol and the like; aromatic hydrocarbons such as benzene, toluene, xylene, and the like; lower alkyl ketones such as acetone, 2-butanone, and the like; lower alkyl esters such as ethyl acetate, n-amyl acetate, and the like; and nitrogen heterocyclic solvents such as pyridine, picoline, lutidine, and the like. Suitable bases include nitrogen bases such as triethylamine, 1,4-diazabicyclo-[2,2,2]- octane, N,N,N',N'-tetramethyl-1,8-diaminonaphthalene, and the like; inorganic bases such as sodium hydride, lithium hydride, and the like; organometallic bases such as methyl magnesium halide, n-butyl lithium, phenyl lithium and the like. When the solvent employed is a basic organic nitrogen compound such as pyridine, picoline, etc., it may not be necessary to employ an additional base since the organic nitrogen compound can perform both functions. The carbonate ester product obtained as the result of the foregoing operations may be recovered either by vaporizing off some of the solvent or by the addition of excess cold water or dilute mineral acid depending on the solubility of the reaction solvent in water to precipitate a solid and filtering off the latter. The solid product may then be purified by conventional procedures such as washing, triturating, recrystallizing, etc.

The following examples illustrate the invention but are not to be construed as limiting:

EXAMPLE I

Ethyl 2-Methyl-3-(thiazol-2-ylcarbamyl)-2H-1,2-benzothiazine 1,1-dioxide-4-yl Carbonate

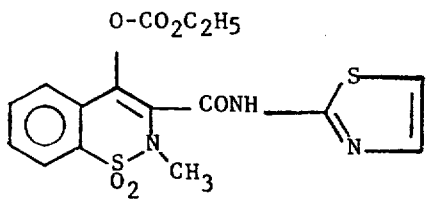

N-(2-thiazolyl)-4-hydroxy-2-methyl-2H-1,2-benzothiazine-3-carboxamide 1,1-dioxide, 6.75 g (0.02 mole), was dissolved in 800 ml of aqueous alkaline solution (prepared by adding 60 ml of 10% sodium hydroxide to water). To this solution was added 60 ml of ethyl chloroformate in 10 ml portions with vigorous stirring after each addition while the pH was maintained between 8 and 10 by the addition of such amounts of 10% sodium hydroxide as necessary to accomplish this. As a result of these operations, the desired ethyl 2-methyl-3-(thiazol-2-yl-carbamyl)-2H-1,2-benzothiazine 1,1-dioxide-4-yl carbonate was formed in the reaction mixture as a lemon-yellow solid in a yield of 7.15 g of 87.5 percent of theoretical. The product was purified by dissolving in 1,2-dichloroethane by warming on the steam bath and recrystallizing. After repeated recrystallizations, a purified product of m.p. 203°–205°C was obtained.

Anal. Calcd. for $C_{16}H_{15}N_3O_6S_2$: C, 46.94; H, 3.69; N, 10.26; S, 15.66. Found: C, 46.62; H 3.66; N, 10.09; S, 15.59

EXAMPLE II

In a similar operation, 6.71 g (0.02 mole) of N-(5-methylisoxazol-3-yl)-4-hydroxy-2-methyl-2H-1,2-benzothiazine-3-carboxamide 1,1-dioxide is dissolved in aqueous alkali and 50 ml of methyl chloroformate added portionwise thereto with stirring while the pH is maintained between 8 and 10 to obtain a methyl 2-methyl-3-(5-methylisoxazol-3-yl-carbamyl)-2H-1,2-benzothiazine 1,1-dioxide-4-yl carbonate product.

EXAMPLE III

N-(4,5-Dimethylthiazol-2-yl)-4-hydroxy-2-methyl-2H-1,2-benzothiazine-3-carboxamide 1,1-dioxide, 7.31 g (0.02 mole), is dissolved in 100 ml of dimethyl sulfoxide. To the resulting solution is added 2.23 ml (0.022 mole) of triethylamine to obtain the conjugate base of N-(4,5-dimethylthiazol-2-yl)-4-hydroxy-2-methyl-2H-1,2-benzothiazine-3-carboxamide 1,1-dioxide. Benzyl chloroformate, 3.75 g (0.022 mole), is next added portionwise and with stirring to obtain the desired carbonate ester product in the reaction mixture. The reaction mixture is diluted with cold water to obtain a precipitate of benzyl 2-methyl-3-(thiazol-2-ylcarbamyl)-2H-1,2-benzothiazine 1,1-dioxide-4-yl carbonate product.

EXAMPLE IV

In a further similar operation N-(4-methylthiazol-2-yl)-4-hydroxy-2-methyl-2H-1,2-benzothiazine-3-carboxamide 1,1-dioxide is dissolved in aqueous alkali and ethyl chloroformate added portionwise thereto with stirring while the pH is maintained between 8 and 10 to obtain an ethyl 2-methyl-3-(4-methylthiazol-2-yl-carbamyl)-2H-1,2-benzothiazine 1,1-dioxide-4-yl carbonate product.

In a manner similar to that described in Example IV, phenyl 3-(4,5-dimethylthiazol-2-ylcarbamyl)-2-ethyl-2H-1,2-benzothiazine 1,1-dioxide-4-yl carbonate product is obtained from N-(4,5-dimethylthiazol-2-yl)-2-ethyl-4-hydroxy-2H-1,2-benzothiazine-3-carboxamide 1,1-dioxide and phenyl chloroformate.

EXAMPLE VI

In operations carried out employing similar molar amounts of reactants and conditions as described in Example I, the following compounds may be prepared from the appropriate N-heteroaryl-2-alkyl-4-hydroxy-2H-1,2-benzothiazine-3-carboxamide 1,1-dioxide and the appropriate chloroformic ester:

Amyl 2-methyl-3-(thiazol-2-ylcarbamyl)-2H-1,2-benzothiazine 1,1-dioxide-4-yl carbonate.
Methyl 3-(isoxazol-3-ylcarbamyl)-2-methyl-2H-1,2-benzothiazine 1,1-dioxide-4-yl carbonate.
Benzyl 3-(isoxazol-3-ylcarbamyl)-2-methyl-2H-1,2-benzothiazine 1,1-dioxide-4-yl carbonate.
Phenyl 3-(4,5-dimethylisoxazol-3-ylcarbamyl)-2-methyl-2H-1,2-benzothiazine 1,1-dioxide-4-yl carbonate.

The products of the present invention are useful in several chemotherapeutic applications.

One of the utilities is as an antithrombotic agent to inhibit aggregation of platelets. Illustrative of the usefulness of the compounds as antithrombotic agent is the following operation: Platelet-rich plasma was prepared to contain a standardized amount (300,000/mm³) of platelets. Platelet aggregation was measured by the method of Born (Nature, 194, 927 (1962)) utilizing a 160-fold diluted preparation of soluble (Holmsen, Ostvold and Bay, Biochem. Pharmacol. 22, 2599 (1973)) bovine tendon collagen to induce aggregation. In a representative operation, 0.45 ml of platelet-rich plasma was treated with ethyl 2-methyl-3-(thiazol-2-ylcarbamyl-2H-1,2-benzothiazine 1,1-dioxide-4-yl carbonate to give a final concentration of 10 μM. Thereafter, 0.05 ml of the collagen preparation was added and the turbidity recorded. The results showed inhibition of aggregation as follows:

| plasma Source | Concentration of Carbonate Ester Compound in $1\times10^{-6}$ moles/liter($\mu$m) | Percent Inhibition of Aggregation |
|---|---|---|
| Rabbit | 25 | 80 |
| Human | 10 | 65,88* |

*second experiment

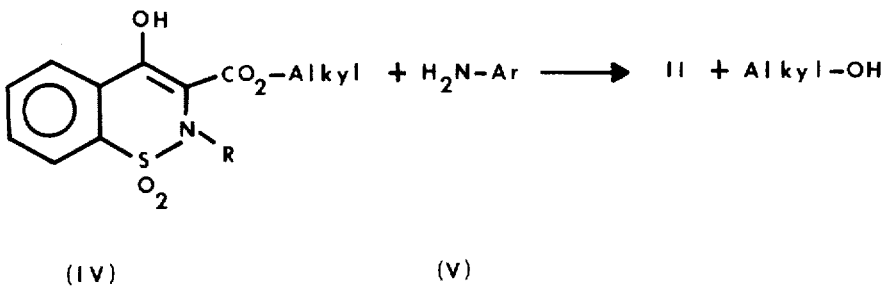

(IV)                    (V)

Similar inhibition of aggregation may be obtained with other compounds represented by Formula I.

Another property shown by the products of the present invention is an antinociceptive effect which renders them useful as components in analgesic preparations. Antinociceptive properties of Formula I compounds may be seen in the mouse writhing test as reported in Br. J. Pharmac. Chemother., 32, 295–310 (1968). In a representative operation, mice were treated orally with ethyl 2-methyl-3-(thiazol-2-ylcarbamyl)-2H-1,2-benzothiazine 1,1-dioxide 4-yl carbonate at a dosage range of 39.6 to 168.3 mg/kg. After twenty minutes the mice which had been treated (per os) with the test compound and untreated controls were injected intraperitoneally with acetyl choline bromide (5.5 mg/kg) and the abdominal constriction responses compared. It was found that ethyl 2-methyl-3-(thiazol-2-ylaminocarbonyl)-2H-1,2-benzothiazine 1,1-dioxide-4-yl carbonate was effective in reducing the abdominal constriction responses.

Additionally, the compounds have anti-inflammatory properties rendering them useful as components in compositions for combatting swelling and pain in inflammatory disorders such as arthritis. A representative operation showing anti-inflammatory activity is the M. Butyricum induced rat paw edema assay. In this test, 160–190 gram rats which previously had been injected subcutaneously in one hind paw with 0.75 mg of M. Butyricum and in which by the eleventh day there had been induced edema of at least 0.25 ml were employed. Test animals were dosed daily for four days thereafter with ethyl 2-methyl-3-(thiazol-2-ylcarbamyl)-2H-1,2-benzothiazine 1,1-dioxide-4-yl carbonate at a rate of 50 mg/kg (per os) while control animals were given saline. Comparison of the paw sizes of treated and control animals on the first and fifth days showed 58.6 percent edema inhibition in the paw of the treated animals. Similarly, edema inhibition may be observed employing the subject compounds at dosages in the range of from about 0.5 to about 100 mg/kg.

The benzothiazine dioxide compound starting materials of Formula II generally have been reported in the literature. A preferred method for preparing the starting materials may be represented by the following reaction scheme:

Generally, 2-alkyl-4-hydroxy-3-(lower alkoxy-carbonyl)-2H-1,2-benzothiazine-1,1-dioxide (IV) is heated under reflux with an aminoisoxazole or aminothiazole compound (V) in an inert solvent such as xylene for several hours, preferably, with the simultaneous removal of the by-product alcohol to obtain the desired 2-alkyl-3-(3-heteroarylcarbamyl)-4-hydroxy-2H-1,2-benzothiazine 1,1-dioxide compound. The preparation of 2-alkyl-4-hydroxy-3-(lower alkoxycarbonyl)-2H-1,2-benzothiazine-1,1-dioxide (VI) may be found in U.S. Pat. Nos. 3,501,466 and 3,591,584. Alternatively, the compounds of Formula II may be prepared by contacting an appropriate 2-alkyl-2H-1,2-benzothiazine-4(3H)-one 1,1 dioxide (VI) with a heteroaryl isocyanate (VII) in the presence of a slight molar excess base for time sufficient to complete the reaction and thereafter pouring the reaction mixture into a slightly acidic ice water to precipitate the compound of Formula II. The base may be an organic base such as triethylamine or trimethylamine in an inert organic solvent such as dimethyl sulfoxide or dimethylformamide. When an organic base is employed, the reactants are preferably contacted under reflux for from a few minutes to seveal hours. Alternatively, an inorganic base such as sodium hydride in a solvent such as dimethylformamide may be employed. Under these conditions, the reactants in an anhydrous solvent are added to the base. The following diagrammatic scheme further illustrates the foregoing reaction:

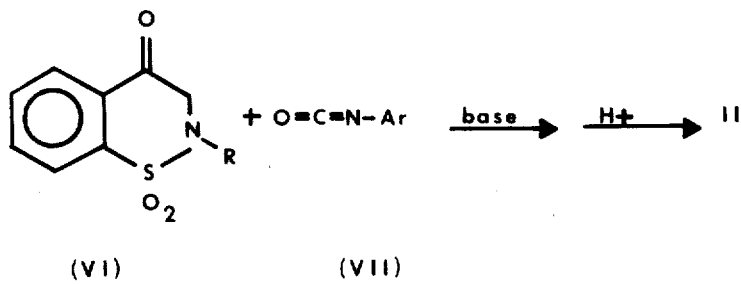

(VI)                    (VII)

The 2-alkyl-2H-1,2-benzothiazine-4(3H)-one 1,1-dioxide (VI) and heteroaryl isocyanate (VII) compounds employed in the foregoing synthesis are either known compounds or else can easily be prepared using methods well-known to those skilled in the art, starting from readily available materials.

Many of the chloroformic ester (III) starting materials are available commercially. Others may be prepared readily from phosgene and appropriate alcohol by methods well-known to those skilled in the art.

What is claimed is:

1. A compound represented by the formula

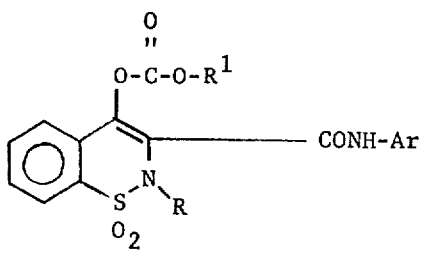

wherein

R is lower alkyl;

$R^1$ is selected from the group consisting of lower alkyl, phenyl and benzyl; and Ar is a heteroaryl radical selected from the group consisting of 2-thiazolyl, 3isoxazolyl and mono- and di-methyl substituted 2-thiazolyl and 3-isoxazolyl.

2. A compound according to claim 1 which is Ethyl 2-Methyl-3-(thiazol-2-ylcarbamyl)-2H-1,2-benzothiazine 1,1-dioxide-4-yl Carbonate.

* * * * *